United States Patent [19]

Kovac

[11] 4,452,614

[45] Jun. 5, 1984

[54] APPARATUS FOR COLLECTION OF DUST AND SOOT BY WETTING

[76] Inventor: Ervin Kovac, Industrial Zone, Haifa Bay, Israel

[21] Appl. No.: 287,988

[22] Filed: Jul. 29, 1981

[30] Foreign Application Priority Data

Aug. 5, 1980 [IL] Israel .................................... 60766

[51] Int. Cl.³ ............................................ B01D 47/00
[52] U.S. Cl. ................................... 55/220; 261/118; 261/126; 261/DIG. 9
[58] Field of Search ............... 261/17, 126, 115, 118, 261/DIG. 9; 110/119, 215; 55/220

[56] References Cited

U.S. PATENT DOCUMENTS

| 917,561 | 4/1909 | Double | 261/118 |
| 1,065,985 | 7/1913 | Swem | 201/117 |
| 4,295,865 | 10/1981 | Su | 261/118 |

FOREIGN PATENT DOCUMENTS

| 212293 | 7/1909 | Fed. Rep. of Germany | 261/118 |
| 707139 | 7/1931 | France | 261/118 |
| 743172 | 3/1933 | France | 261/118 |
| 621881 | 6/1961 | Italy | 261/126 |

*Primary Examiner*—Bernard Nozick
*Attorney, Agent, or Firm*—Buell, Blenko, Ziesenheim & Beck

[57] ABSTRACT

A dust and soot collector surrounds a top portion of a stack or duct. Sprays of water are directed across a path of a gas flow exiting the stack. The water removes particles of dust and soot from the gas. A slush is created which falls into a peripheral trough and is removed.

2 Claims, 6 Drawing Figures

APPARATUS FOR COLLECTION OF DUST AND SOOT BY WETTING

The present day dust and soot collectors' or scrubbers' purpose is to extract dust and soot from air or gas as a source of health hazard and in some cases to recover dust of valuable material during a manufacturing process.

Laws in developed countries deal with prevention of dust dispersion in habitated areas. Dust collection at the source is one of the ways to prevent contamination of air with dust.

BACKGROUND OF THE INVENTION AND DESCRIPTION OF THE PRIOR ART

Today's designs used for dust collection are based on various methods.

1. Cyclones extract dust from air or gas by centrifuging the mixture of air and dust or gas and dust in cone shaped vertical receivers. Due to centrifugal action the heavy particles of dust and soot impinge on the inside wall of the cone gradually progressing by weight to the bottom of the cone into a collecting receptacle.

2. Dust-extracting boxes through which air or gas carrying dust flows along the walls of dust-adsorbing material forming labyrinths. Dust clings to the walls and the accumulated dust layers becoming heavy separate from the walls falling into collecting troughs.

3. Dust-arresting sieves in frames enclosed within cameras through which dust-laden air or gas flows leaving behind layers of dust clinging to the sieves. These sieves are periodically cleaned.

4. Air or gas washing compartments also called scrubbers. Water sheet or water spray in the compartments impinge on the dust and soot particles and the resulting slush falls into collecting troughs. The washing by water cools the gas or air and as a result slows down the draught and consequently the velocity of gas flow to the stack and out of the stack above the vicinity.

5. Electric precipitators in dust collecting cameras charge dust particles with an electric charge. The charged particles are attracted by the electrodes. The accumulated dust on the electrodes is periodically removed.

All these designs are bulky and expensive. They all require periodic removal of contaminants accumulated in the collectors. The removal requires the shut-down of the gas or air flow. Alternatively double collectors are fitted. One of the collectors is in use whilst the other is being cleaned.

None of these collectors entirely remove the dust and soot particles from the air or gas flow. These residual unremoved particles within the air or gas flow are carried high up in the stack. The air or gas gradually descends to the ground level carrying with it the residual dust and soot particles causing pollution of the vicinity. This is the case when there is no wind around the stack. When there is a wind the contaminants are carried in the direction of the wind, and depending upon the velocity of the wind cause pollution in areas close to the stack or far away from it.

The present invention removes these contaminants at the exit from the stack just before the gas or air carrying the contaminants enter the atmosphere.

There might be cases when gas only with no contaminants emanates from the stack. The gas might be as a result of a chemical process and has a harmful effect on human beings even when mixed with air around the area of the stack or when carried far away from the stack by the wind. Sprays of water into the gas according to this invention may wash the gas and lessen the harmful effect. The invention can be used as a second and final stage of removal of the contaminants left over from the dust collectors installed before the gas or air enter the stack.

Alternatively the invented dust collector will remove all contaminants at the exit from the stack when due to lesser density of contamination previous stages of dust collecting are not necessary, thereby saving on investment.

Today's stacks disperse contaminants left in the gas or air flowing from the dust collectors, high above the ground to improve ecology. This invention will make the construction of high stacks unnecessary in most cases. These contaminants are extracted entirely at the stack exit as further described and are not dispersed into the surrounding air.

BRIEF DESCRIPTION OF THE DRAWINGS

In the accompanying drawings, I have shown present preferred embodiments of the invention in which.

DESCRIPTION OF THE INVENTION

Figure 1:
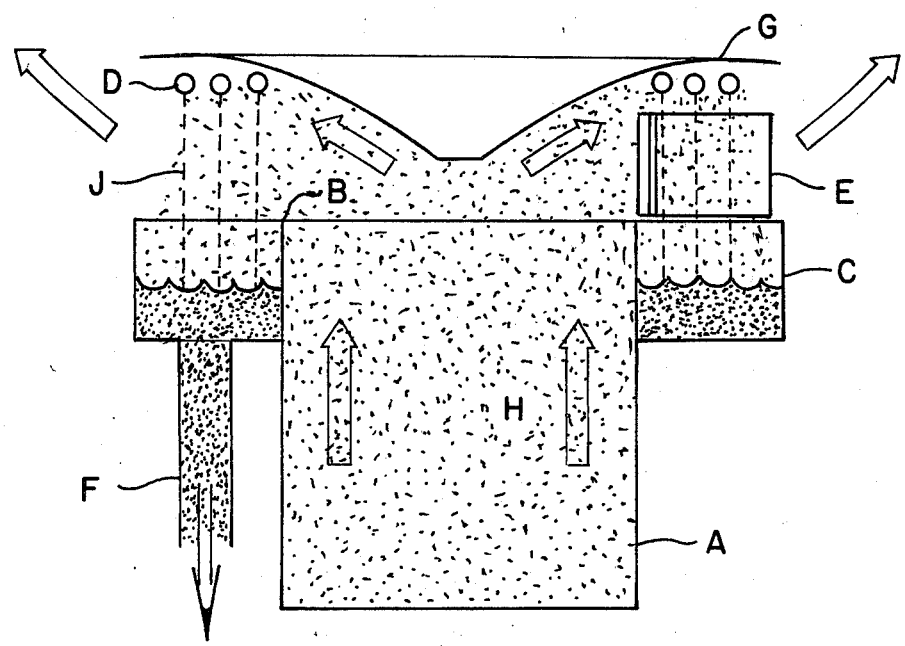
FIG. 1 is a side elevational view diagram showing a first embodiment of a dust collector surrounding a stack in which a hood is used with water jets to provide a spray.
Figure 2:
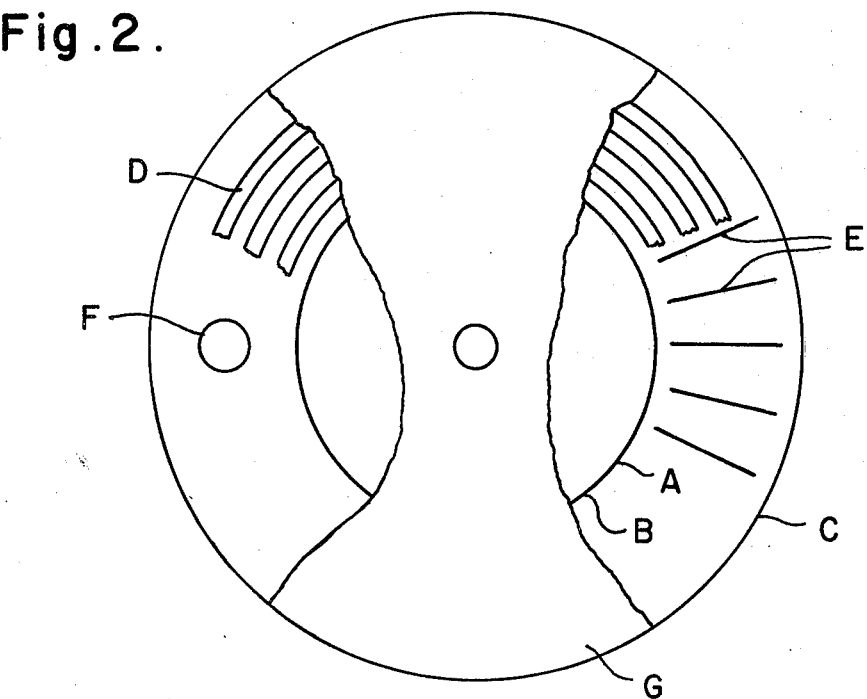
FIG. 2 is a cutaway plan view of the embodiment shown in FIG. 1.

FIGS. 1 and 2 Sheet No. 1 of the accompanying diagrams show the essential details of the invention. Gas or air carrying particles H of contaminants ascend in the stack A. At the exit B of the stack A the ascending gas or air is diverted by a streamlined hood beyond the periphery of the stack end B. Pipes D carrying water under regulated pressure and fitted around and above the periphery of the stack end B provide a number of curtains made up of water spray or water sheet J. The water spray or sheets of water J impinge upon the particles of dust or soot. The resulting slush falls into the collecting trough C around the periphery of the stack end B. Clean gas or clean air leaves the periphery of the stack end into the free air around the stack end. The slush is conveyed to the ground level by pipe F. Water separated from the slush may be recycled by pumping.

FIGS. 1 and 2 also sketch another alternative of the number of ways of work based upon the essentials of this invention. Upon blades E straight, radial, curved or inclined around and above the periphery of the stack exit B impinge the ascending dust particles. Water spray radial or inclined or tangential to the stack exit also impinges upon the ascending dust or soot particles and also washes off the slush accumulated on blades E. The slush drops into the trough C below the blades. From the trough the slush is conveyed to ground level by pipe F.

Figure 3:
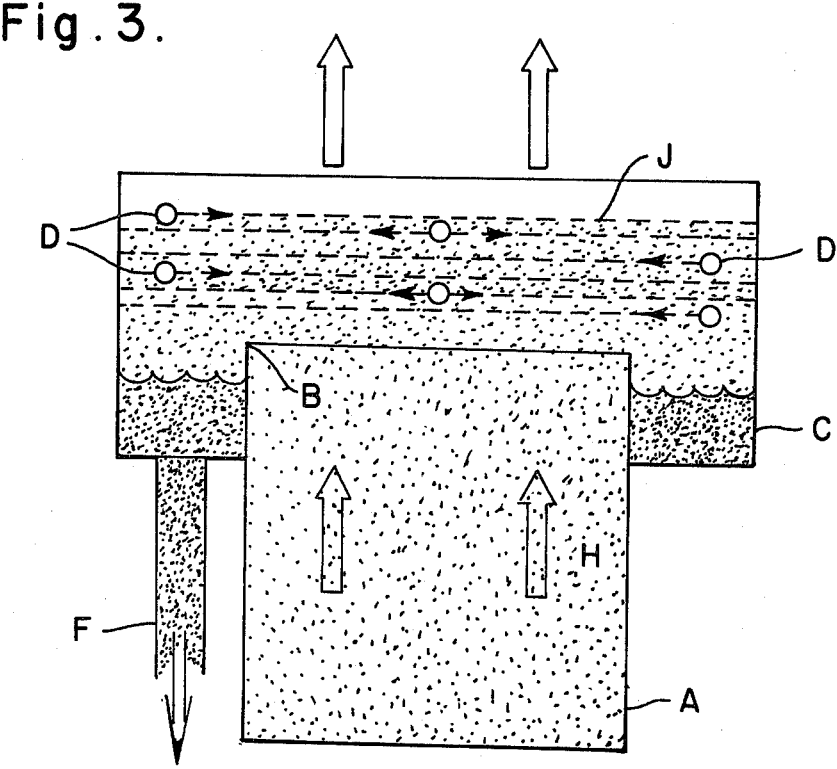
FIG. 3 is a side elevational view diagram showing a second embodiment of the invention having non interfering levels of water jets.
Figure 4:
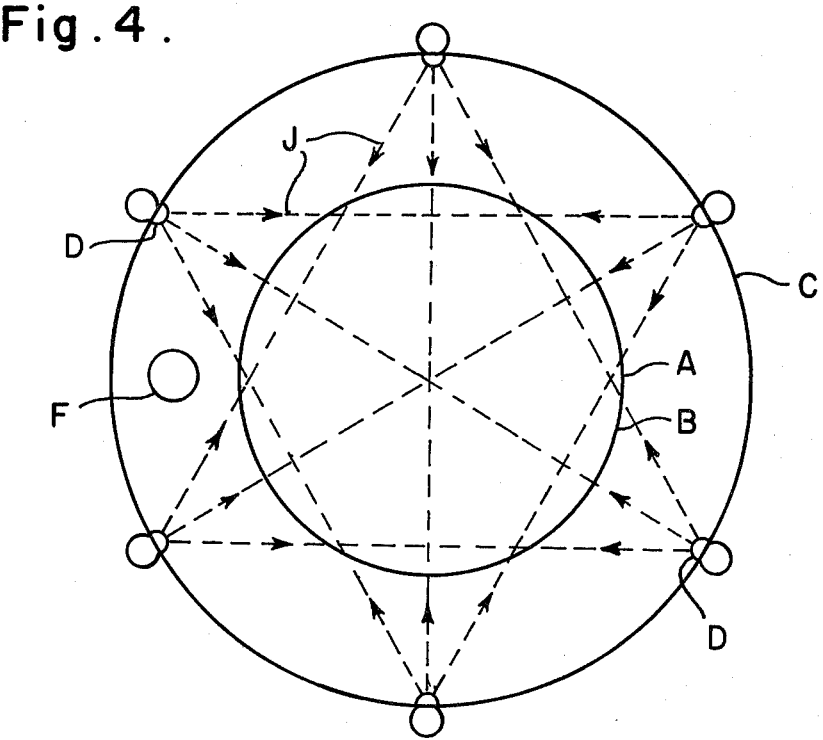
FIG. 4 is a plan view of the embodiment shown in FIG. 3.

FIGS. 3 and 4 show another design based upon the invention. There is no hood over the stack A directing the ascending gas or air. Jets D of water spray or water curtain J, radial or inclined or tangential to the stack end B impinge upon the ascending dust and soot particles H. The water droplets containing the dust or soot particles are carried by the inertia of the spray J above and beyond the periphery of the stack end B into the collecting trough C. From the trough the slush is conveyed to the ground level by pipe F. Each of the jets D and consequently the flat, fanning out sprays J are on different levels so that they do not interfere with each other. The FIGS. 3 and 4 show a total of 6 fanning out sprays J on different levels. Many more than 6 non interfering levels of sprays can be built up as may be required by the density of dust or soot particles in the ascending gas.

Figure 5:
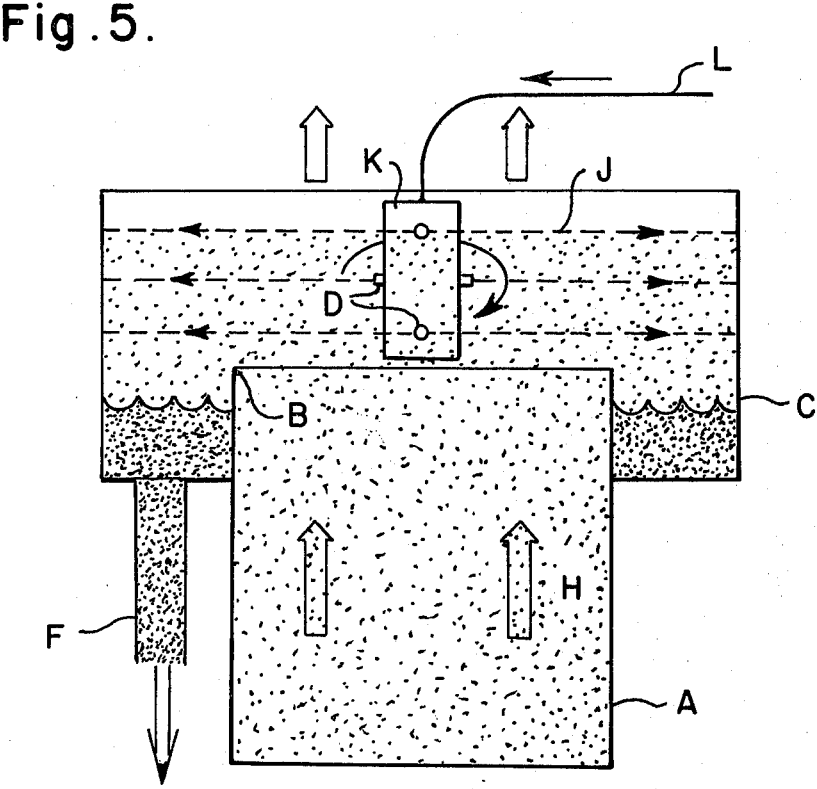
FIG. 5 is a side elevational view of a third embodiment having a rotating container.
Figure 6:
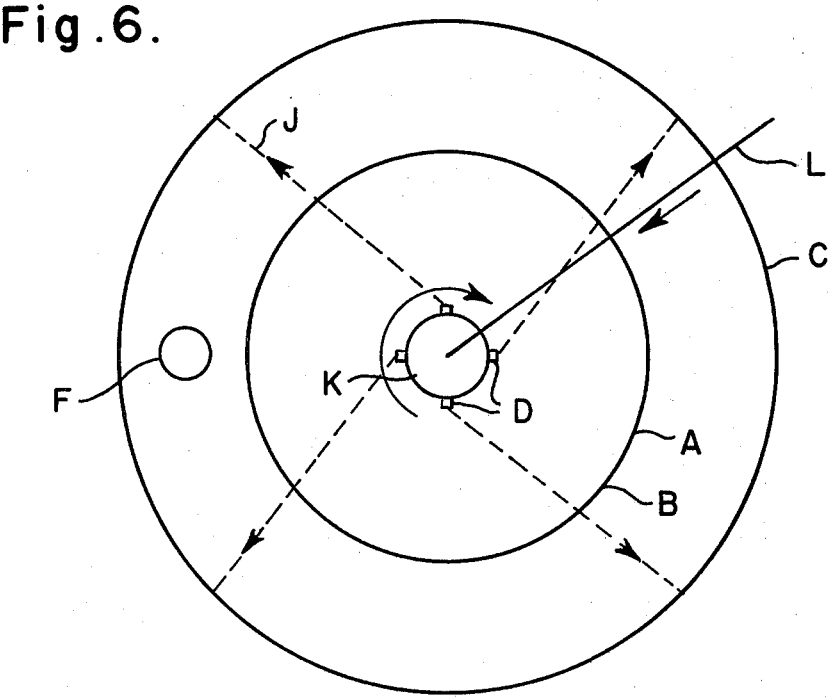
FIG. 6 is a plan view of the embodiment shown in FIG. 5.

FIGS. 5 and 6 show yet another design based upon the invention. Gas or air carrying particles H of contaminants ascend in the stack A. Water under pressure is piped through line L into a container K in the centre above the stack exit B. This container spins around on its axis. By centrifugal action and pressure water is forced through jets D from the container. The revolving water sprays or water curtains J impinge upon the ascending dust and soot particles H. The water droplets or water curtains containing the dust and soot particles are carried above and beyond the periphery of the stack end B into the collecting trough C. From the trough the slush is conveyed to ground level by pipe F. The height and revolutions of the revolving container K, consequently the density of sprays or curtains are determined by the density of the ascending particles H from the stack end B.

DEFINITIONS

For the purpose of this invention:

Water; $H_2O$ in any form, at any temperature clear or mixed with any additive soluble or insoluble, or steam at any pressure or any speed of flow.

Dust; any particles in the air or gas of any size or any consistency, organic or inorganic at any temperature or at any speed of flow.

Soot; any fume particles present in the gas or air stream resulting from complete or incomplete combustion, of any consistency at any temperature or at any speed of flow.

Dust, soot or any particles are also named here as unspecified contaminants.

Stack and stack end; is a means to convey dust or soot laden gas or air high above the vicinity. The cross section of the stack is either round or elliptical or oval or oblong, or rectangular or square.

Having now particularly described and ascertained the nature of my said invention and in what manner the same is to be performed I declare what I claim is:

1. An apparatus for collection of dust and soot particles emitted by a gas leaving a stack comprising:
   (a) spray means including water inlet pipe means positioned circumferentially above and beyond a periphery of the stack including a plurality of spaced jet means for directing a plurality of horizontal fan like water sprays from a plurality of different fixed circumferential locations toward and across an imaginary extension of the stack above the top of the stack, each jet means directing a water spray horizontally outward from a separate location and said jet means positioned along an arc while each being maintained on a single horizontal level, each of the circumferential locations being on a different vertical level from each other and all of said locations being evenly and substantially spaced-apart so that each jet means delivers a spray completely across the top of the stack without interference from other such sprays and so that the jet means delivers fan like sprays in the form of a symmetrical star-like pattern of water sprays when viewed from above covering the entire area directly above the stack through which the gas passes;
   (b) collector means being unobstructed and having an inside diameter greater than the inside diameter of the stack and extending above the stack and surrounding the spray means and for collecting the sprays containing the dust and soot particles, the collector means having an unobstructed gas outlet opening therein to permit the gas to freely escape from the collector; and
   (c) water outlet means coupled to the collector means for removal of water, dust and soot particles therefrom.

2. An apparatus according to claim 1 wherein the water outlet means is a drain means coupled to the collector means and extending downwardly from a lower portion thereof.

* * * * *